United States Patent [19]

Mägerle

[11] Patent Number: 4,664,284
[45] Date of Patent: May 12, 1987

[54] CONTAINER OF TUBULAR FORM

[75] Inventor: Karl Mägerle, Küsnacht, Switzerland

[73] Assignee: KMK Karl Magerle Lizenz, Zug, Switzerland

[21] Appl. No.: 852,098

[22] Filed: Apr. 14, 1986

Related U.S. Application Data

[63] Continuation of Ser. No. 375,747, May 6, 1982, abandoned.

[30] Foreign Application Priority Data

May 7, 1981 [CH]  Switzerland ............... 2956/81

[51] Int. Cl.⁴ ............................................. B65D 35/10
[52] U.S. Cl. ..................................... 220/67; 264/262; 222/107
[58] Field of Search ................ 220/67, 66; 264/262; 222/107

[56] References Cited

U.S. PATENT DOCUMENTS 3,260,411  7/1966  Dobson ........................ 222/107
3,260,777  7/1966  Brandt ......................... 264/262
3,465,917  9/1969  Saeki .......................... 222/107
3,565,293  2/1971  Schultz .
4,011,968  3/1977  McGhie et al. ................ 222/107
4,021,524  5/1977  Grimsley .................... 264/262 X
4,132,331  1/1979  Magerle ...................... 222/107
4,185,757  1/1980  Schultz ....................... 222/107

Primary Examiner—Steven M. Pollard
Attorney, Agent, or Firm—Cushman, Darby & Cushman

[57] ABSTRACT

The production of a tubular container is effected by rolling and lap-welding a multi-ply foil to form a cylindrical tube body (1), the arrangement of a collar (5) which partially closes this tube body (1) at the top, and the production of a head piece (4) of plastics material, which on the one hand connects the tube body (1) to the collar (5) and on the other hand forms the top closure of the tube. The collar (5) has a simple basic form before working and is brought by the working into a form in which its cut edges can be covered by plastics material flowing thereover, this shaping requiring no additional working operation, but being effected by the forces set up during the moulding process of the plastics material. Further by the shaping of the collar (5), the spacing between the collar and the tube body is reduced, thereby further improving protection against diffusion.

6 Claims, 3 Drawing Figures

CONTAINER OF TUBULAR FORM

This is a continuation of application Ser. No. 375,747 filed May 6, 1982 which was abandoned upon the filing hereof.

In the German Patent Specification No. 1 486 193 a tubular container is described which consists of a cylindrical tube body rolled from a multiply foil, an annular disc-form insert having a barrier layer and a plastics head-piece formed thermoplastically which is joined not only to the tube body, but also to the insert in such a way that the cut edges of the insert are completely surrounded by plastics material.

The method of production for this container follows a process mentioned in the prior art for this patent specification, which consists essentially in the production of the cylindrical tube body, the preforming of the insert in its final form and the connection of these two parts with the simultaneous production of the head-piece for the container, which consists of plastics material.

With containers of this kind there exists the problem of keeping as small as possible the space between the outer edge of the insert and the adjacent edge of the tube body, which space is filled with the plastics material of the head portion. This space constitutes an undesirable interruption in the barrier layer which is present in the tube body and continued in the insert. On the other hand however, a sufficient amount of plastics material is required in the junction region between the insert and the tube body. The necessary welding heat for the production of the welded connection between the thermoplastics outer layer of the tube body and that of the insert on the one hand, and the head portion to be formed on the other hand, is supplied by the plastified plastics material in the formation of the head portion. The temperature of the plastified plastics material on issuing from the plastifying appliance has an upper limit and therefore care can only be taken to ensure that the plastified plastics material loses as little heat as possible on the way from the plastifying appliance to the junction region.

This problem is solved by the invention by producing a better welded connection, especially between the head portion and the tube body, while at the same time reducing the width of the annular gap between the barrier layer of the tube body and that of the insert hereinafter referred to as the "collar".

The solution of this problem is achieved by the features described and claimed herein. By placing plastics material of the head portion on the side of the collar facing away from the neck portion, a longer connecting region results between the head portion and the tube body, whereby the collar is welded to the plastics material of the head portion both on the side facing towards the neck portion and on the side facing away from the neck portion. Thereby the cut edge of the outer edge of the collar is also positively shielded by plastics material with respect to the hollow space bounded by the tube body and therefore with respect to the contents of the container. On the other hand, as the outer edge of the collar is disposed more or less radially with respect to the axially extending tube body, the collar can theoretically abut directly on this tube body. Although the connecting region between the plastics material of the head portion and the tube body is divided into two sections by the collar, weakening of the connection as a result of the radial disposition of this edge and the adequate welding heat does not occur. On the other hand the construction according to the invention has the advantage for the attainment of a faultless connection with the tube body, that it does not depend on the wall strength of the plastics material in the shoulder portion. Rather the wall strength in the shoulder portion must only be selected to be sufficient for this to retain the necesessary stability in its shape. In all therefore, a saving of plastics material is possible and also a shortening of the cooling time under the same cooling conditions, due to the better division of material.

It is however of paramount importance that the annular gap or interruption between the barrier layer in the tube body and that in the collar is reduced to a minimum.

The invention also concerns a process for the production of tubular containers by which the problem is solved of facilitating the introduction of plastics material into the hollow mould space on the side of the collar turned away from the neck portion. The solution to this problem is effected by the features characterised in claim 5.

The realisation that under the action of the forces developed by the plastics material, a deformation of the collar is possible such that the outer edge thereof is raised from the core, permits this deformation to bring about at least partial closure of the annular gap between the barrier layer of the tube body and that of the collar during the moulding of the head portion. It is thereby possible for the plastics material which was introduced into the hollow space of the mould to form the head portion and the connection thereof with the tube body to come into contact therewith over the whole region of the connection even before the deformation of the collar has taken place or been completed. Thus the flow of the plastics material into the region of the connection and onto the side of the collar directed away from the neck portion is not hindered by the outer edge of the collar.

In contrast to the known process initially described above the process according to the invention also permits a saving in production costs for the collar, as the embedding of the cut edges thereof in plastics material comes about without special moulding tools. Finally, the collar, if mounted on the core before the tube body, can also act as a deflecting and centralising surface and prevent the tube body from coming into contact with the top of the core.

In order to ensure good seating of the collar on the core and to be able to ignore the production tolerances of the collar, it is advantageous for the central aperture in the collar to be made undersize, so that on pressing the collar onto the core, a cylindrical lip or fin is formed, which on the one hand guarantees an exact central seating of the collar on the core and on the other hand creates the possibility for the plastics material to flow around it in the production of the plastics material part.

The shaping of the collar under the action of the plastics material results from pressing onto the hollow channel of the core, by which it conforms to the shape thereof, a flange-like region bent up from the remainder of the collar body being produced analogously to the rim, which is produced by pressing the collar onto the core, around which region the plastics material likewise flows. The outer cut edge of the collar is thereby turned up and therefore comes nearer to the tube body.

The collar has the form of a body of rotation in its final form, the generatrix of which seen from the interior outwards presents a region parallel to the axis, two regions extending at an inclination to the axis, each having a different inclination, and a region extending radial to the axis, the first and last regions serving to create the possibility of surrounding their edges with plastics material. The inclined region extending at a lesser angle with respect to the axis is parallel to the course of the shoulder which consists of plastics material.

The invention is more fully described hereinafter with reference to the accompanying drawings, without being restricted to the embodiments shown by way of example.

In the drawings

Figure 1:
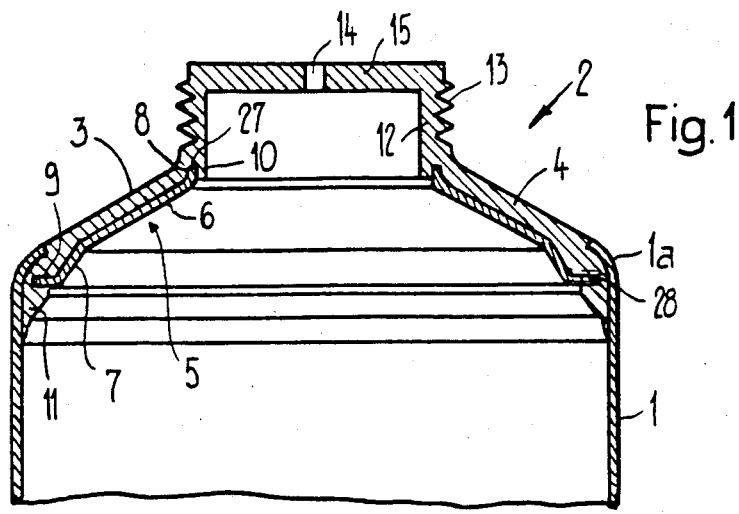
FIG. 1 shows the upper part of a schematically represented tubular container according to the invention, in axial section.

The tubular container shown in FIG. 1 comprises a cylindrical tube body 1, only partially shown, which consists in known manner of several layers. Generally there is here a metallic middle layer enclosed on both sides by a layer of thermoplastics material, binding or adhesive layers being in addition inserted between the metal and plastics layers. The inner plastics layer has the purpose of preventing contact of the contents with the metal so that no undesired chemical reactions can occur. The metal or barrier layer serves for example for suppressing the diffusion of certain constituents of the contents through the tube body 1, an effect which occurs with purely plastics packages if diffusable constituents are present in the contents. The plastics layer disposed on the outside of the tube body protects the metal layer against corrosion and permits the package to be given a pleasing exterior.

The tube body 1 is generally produced from multi-ply foil of this kind by rolling, the abutting ends of the multi-ply foil being overlapped and welded together (not shown). The upper end 1a of the tube body 1 is in the finished condition of the container bent slightly inwards and forms a rounded transition to the tube head generally indicated by 2.

The tube head 2 consists of a head-piece 3 of thermoplastic material as well as a generally approximately conically formed collar 5. The collar 5 is similarly made of multiply foil, which can be indentical in its construction to that of the tube body. The problem now is for the collar with its metal layer to continue in the tube head 2 the diffusion barrier which is present in the tube body 1. Finally the problem arises for the head-piece 3 of thermoplastic material to serve as a carrier for the collar 5 and to connect this to the tube body 1. For this the head-piece 3 has a conical shoulder portion 4.

As is further evident from FIG. 1, the collar as viewed in profile, has two relatively inclined regions 6 and 7 and two marginal regions 8 and 9 embedded in the plastics material of the head-piece 3. This embedding of the marginal regions 8 and 9 in plastics material serves the purpose of covering over the cut edges of the metal layer which are exposed by the cutting or stamping of the multi-ply foil with plastics material against the contents, and preventing an undesired reaction between the metal and active substances of the contents.

The head-piece 3 is connected by the shoulder portion 4 with the upper end 1a of the tube body 1 both on the front face thereof as well as and principally on the inner side by welding to the plastics layers of this tube body. The connecting region between the shoulder portion 4 and the tube body 1 extends now, in accordance with the idea underlying the invention, not only from the front face of the tube body 1 to the height of the marginal region 9, but is continued below this marginal region into an annular plastics material portion 11. For its part, this annular plastics material portion 11 grips the collar 5 on its marginal region 9 and is also connected by fusion welding to the plastics layer of the collar facing the interior of the container. Finally, the layer of plastics material on the upper side of the collar 5 is connected by welding to the shoulder portion 4 over the angled regions 6 and 7 also.

The head-piece 3 also has a neck portion 12 adjoining the shoulder portion 4 and carrying an external screw-thread 13, which neck portion is closed at the top by a horizontal portion 15 provided with an aperture 14. The screw-thread 13 serves for securing a conventional screw cap, not shown, which closes off the aperture 14.

Figure 2:
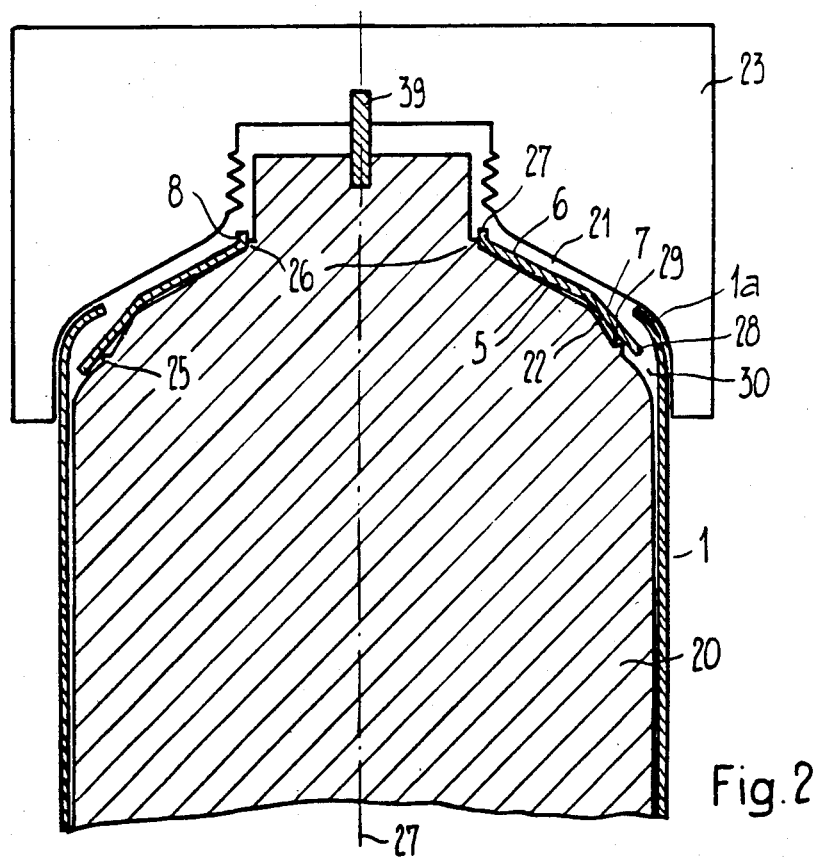
FIG. 2 shows an arrangement for producing the head-piece of the tubular container according to FIG. 1 before introducing the charge of plastics material.
Figure 3:
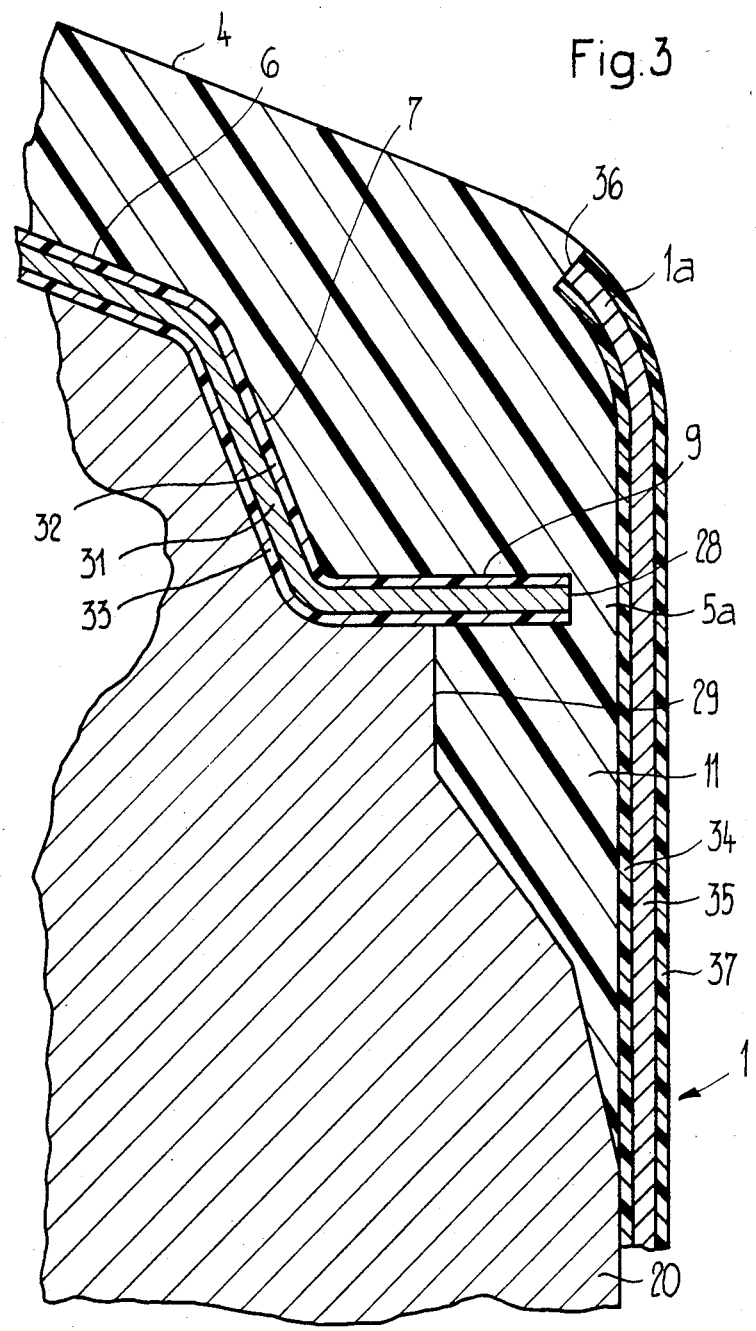
FIG. 3 shows in cross-section to an enlarged scale the device according to FIG. 2 after the production of the tube head.

FIGS. 2 and 3 show an arrangement for producing the tube head 2 and the connection of collar 5 and tube body 1 by the plastics material of the shoulder portion 4. An example of the process is described with respect to this representation. Similar parts are indicated here by the same reference numbers as in FIG. 1.

Numeral 20 indicates a core member which is movable relative to a mould or die 23 and which is in any event axially displaceable. Together with this mould 23, the core defines a hollow mould space 21 for the formation of the tube head 3. In FIG. 2 the hollow mould space 23 is shown closed, i.e. the core is shown in its end position relative to the mould 23, in which the tube head 2 and the head-piece 3 have taken up their respective final shapes.

In the open condition of the mould space, in which the core 20 is spaced from the mould 23, the collar 5 pre-shaped by being blanked out of a multiply foil by stamping is pressed onto this core. From a flat annular disc, a conical hollow body having the regions 6 and 7 is formed by the stamping. When pressing the collar 5 on the core, a deformation of the collar takes place, as its inner diameter is less than the diameter of an annular step 26 provided on the core 20, and the cylindrical region 8 is formed.

As is evident from FIG. 2 the collar 5 overlies an annular shoulder 22 with its region 7 as well as an annular step 25 disposed at a greater diameter and therefore radially spaced relative to this shoulder, whereby a hollow channel 29 is formed between shoulder 2 and annular step 25. The significance of this shape is further explained below. Upon placing the tube body 1 on the core 20, the collar 5 effects a centralising in case the arriving tube body is not precisely positioned on the core and prevents the tube body from being crumpled. In FIG. 2 the upper end 1a of the tube body 1, which projects into the closed hollow mould space 21, is shown bent over inwardly. The tube body receives this shape preferably on being introduced into the mould space 21 together with the core 20. Numeral 39 in FIG. 2 indicates diagrammatically a pin which is arranged coaxially with the core 20 and is mounted therein or in the mould 23 in a manner not shown.

It may be assumed that the plastics material is introduced into the hollow mould space 21 while the latter is still open. For example a process described in the published British Patent Application No. 8022044 may come into consideration in this regard. In such a case the core 20 is arranged over the mould 23 which is open at the top. On closing the hollow mould space the plastics material introduced into the hollow mould space for example, in the form of a ring of plastified material, is divided and flows on the one hand towards the pin 39 to form the neck portion 12. On the other hand plastified plastics material is also displaced radially outwards and reaches the connecting region with the tube body 1. Even if the hollow mould space were to be completely closed at this point of time, or if the parts occupied the relative positions shown in FIG. 2, the outwardly displaced plastics material can flow relatively unhindered between the upper edge 1a of the tube body 1 and the cut edge of the collar 5 indicated by the numeral 28, into the annular space 30. If the plastics material has reached this annular space, the pressure of the plastics material increases over the region 7 of the collar with the result that this is bent in between the annular shoulder 22 and the annular step 25 and is pressed into the hollow channel 29 lying therebetween. This bending-in of the collar has the further result that the adjacent region of the collar extending radially outwards is deformed. This region over its whole radial extent up to the cut edge 28 is bent from the sloping or inclined poisition shown in FIG. 2 into an approximately horizontal position. Thus the radial edge region 9 shown in FIGS. 1 and 3 is formed accordingly.

It is already evident from a comparison of FIGS. 2 and 3 that by the deformation of the collar 5 the plastics material in the annular space 30 also reaches the underside of the collar and that the edge region 9 including the cut edge 28 is thereby embedded in the plastics material.

In this way the metal barrier layer (indicated by 31) of the collar 5 is covered by the plastics material at the cut edge 28, while this is bonded to the plastics layers 32 and 33 of the collar 5. As mentioned, fusion welding also takes place to the inner plastics layer 34 of the tube body 1 over the whole connection region, the plastics material of the shoulder portion 4 similarly flowing over the barrier layer 35 at the cut edge 36 of the tube body, where it also combines with the plastics material layer 37.

It is also important, however, in accordance with the invention, that the edge region 9, although now covered by plastics material, extends into the immediate vicinity of the tube body 1 and reduces the annular gap 5a between this cut edge 28 and the inner side of the tube body 1, closed only by plastics material, to a minimum. The remaining gap between the barrier layer 35 in the tube body 1 and the barrier layer 31 in the collar 5 is then negligible.

As the cylindrical edge region 8 of the collar 5, which is formed on mounting same on the core 20, projects above the annular step 26, this is also embedded in the plastics material forming the neck portion 12, and the cut edge 27 is thereby covered while welding is effected to the plastics material layers 32 and 33.

The process according to the invention affords a substantial saving as compared with the packaging containers produced by known processes. This is primarily due to the fact that it enables the collar to be brought to its final form in a simple manner and without any special tools or shaping steps. The collar receives the necessary shape for embedding in the plastics material upon the moulding of the tube head 2 and the head-piece 3 of this.

I claim:

1. A container of tubular form which comprises:
    a rolled and lap-welded tubular body of multi-ply foil having at least one metallic barrier layer and at least one layer of plastics material;
    a head piece of plastics material having a cylindrical neck portion and shoulder including a conical shoulder portion directly firmly connected to one end of said tubular body;
    an annular conical collar of multi-ply foil having a metallic intermediate barrier layer, said collar having a first surface generally facing outwardly which is disposed on and directly connected to the inside surface of the shoulder portion along the full length of said shoulder portion,
    said collar further having at opposite ends radially inner and outer flanges embedded in the plastics material forming the shoulder,
    said outer flange extending away from the remainder of the collar substantially straight in a substantially radial direction towards the tubular body at a level substantially removed from the shoulder end of said tubular body and having an outer end ending substantially at but not engaging said tubular body,
    said outer flange having a first radial surface directly firmly connected to said shoulder portion; and
    said shoulder further including an annular shoulder extension of plastics material extending axially from said shoulder portion in a direction opposite of said neck portion and being directly firmly connected to the radial flange surface opposite to said first radial surface of said outer flange and being also directly firmly connected to the tubular body for increasing the length and strength of connection between said shoulder and tubular body, said annular shoulder extension fully covering said outer flange at least in the region of said outer end for preventing any exposure of said metallic intermediate barrier layer of said collar.

2. A container according to claim 1, in which:
    the thickness of the plastics material above said outer flange but in the region between the tubular body and the collar is substantially greater than the spacing between the tubular body and the outer end of said outer flange,
    said shoulder and its said extension is made of thermoplastic material, and said collar including its said outer flange have thermoplastic layers on opposite sides respectively of said intermediate barrier layer thereof,
    there being welding bonds between said thermoplastic layers of said outer flange and said shoulder portion and extension respectively for effecting the said firm direct connections therebetween.

3. A container according to claim 1 or 2, in which the collar is a body of revolution, the generatrix of which has from the interior outwards;
    (a) an inner edge region approximately parallel to the axis;
    (b) a first sloping region extending at a first angle of inclination with respect to the axis;
    (c) a second sloping region extending at an angle of inclination with respect to the axis which differs from said first angle of inclination; and (d) said substantially radially extending outer edge region.

4. A container according to claim 3, in which the sloping region of the collar which extends at the greater angle with respect to the axis is substantially parallel to the outer surface of the shoulder portion of the head piece.

5. A container according to claim 1 or 2 wherein the spacing is minimal between the outer end of the said intermediate metallic barrier layer of said outer flange and the said metallic barrier layer of said tubular body whereby undesirable interruption between said metallic barrier layers is effectively eliminated.

6. A container according to claim 1 or 2 wherein the radial thickness of said shoulder extension is around at least half of the length of the radially extending outer flange.

* * * * *